Oct. 8, 1935.  H. G. RAY  2,016,515
AUTOMOBILE THEFT ALARM
Filed July 1, 1933    3 Sheets-Sheet 2
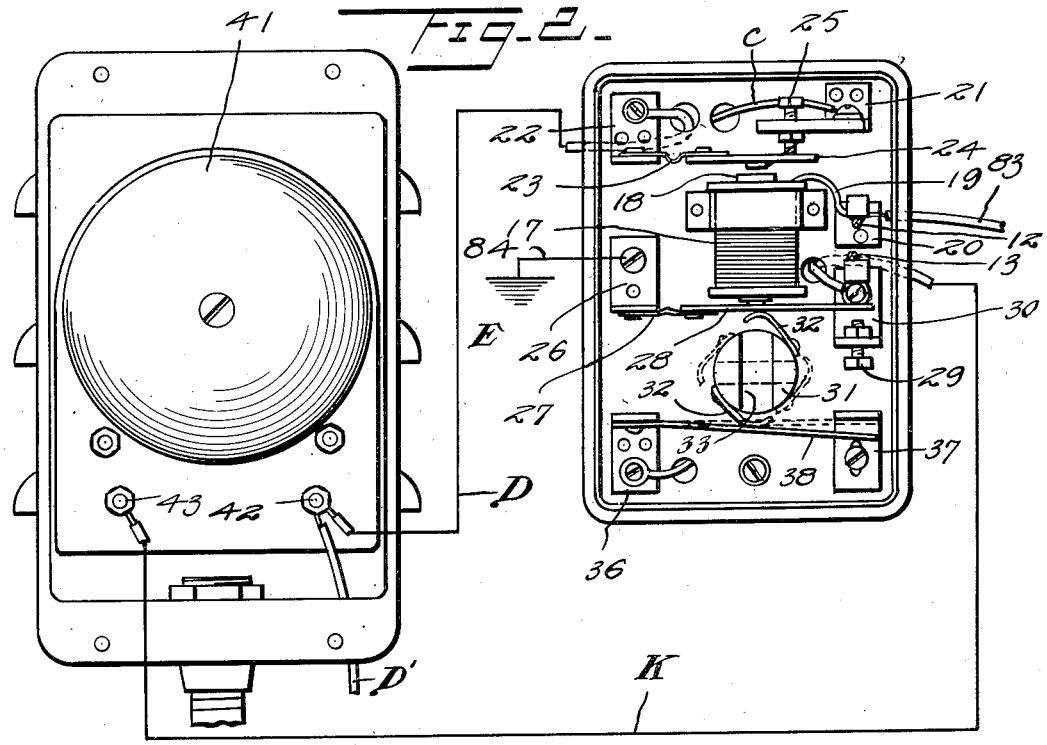
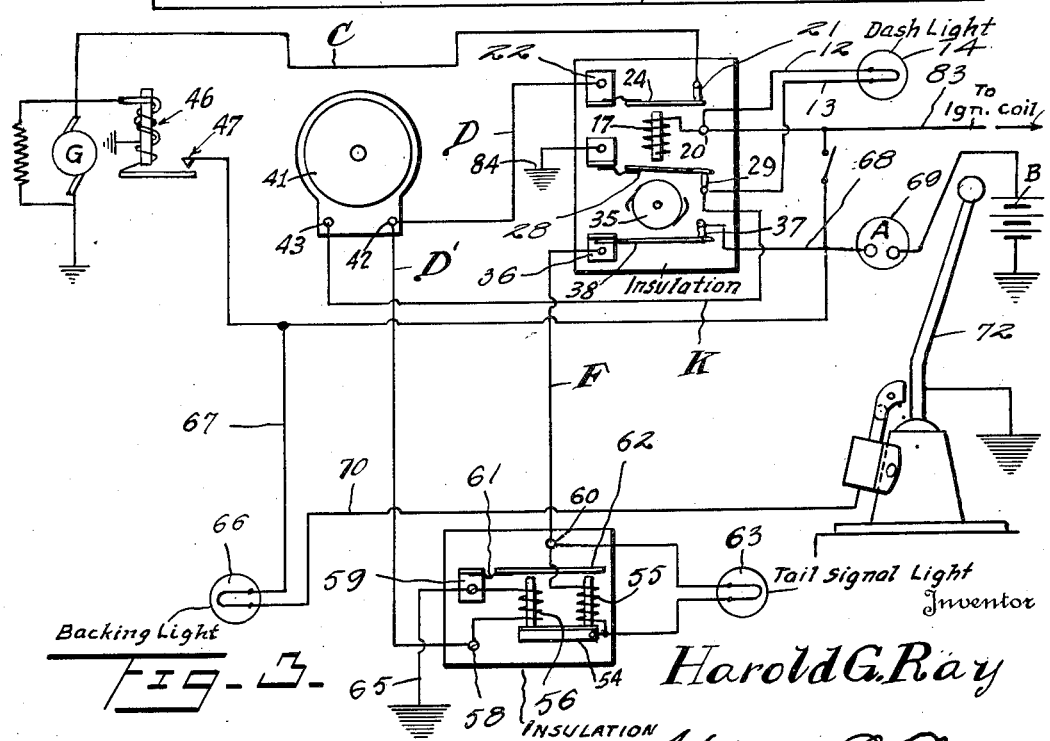
Inventor
Harold G. Ray
By Watson E. Coleman
Attorney Oct. 8, 1935. H. G. RAY 2,016,515
AUTOMOBILE THEFT ALARM
Filed July 1, 1933 3 Sheets-Sheet 3
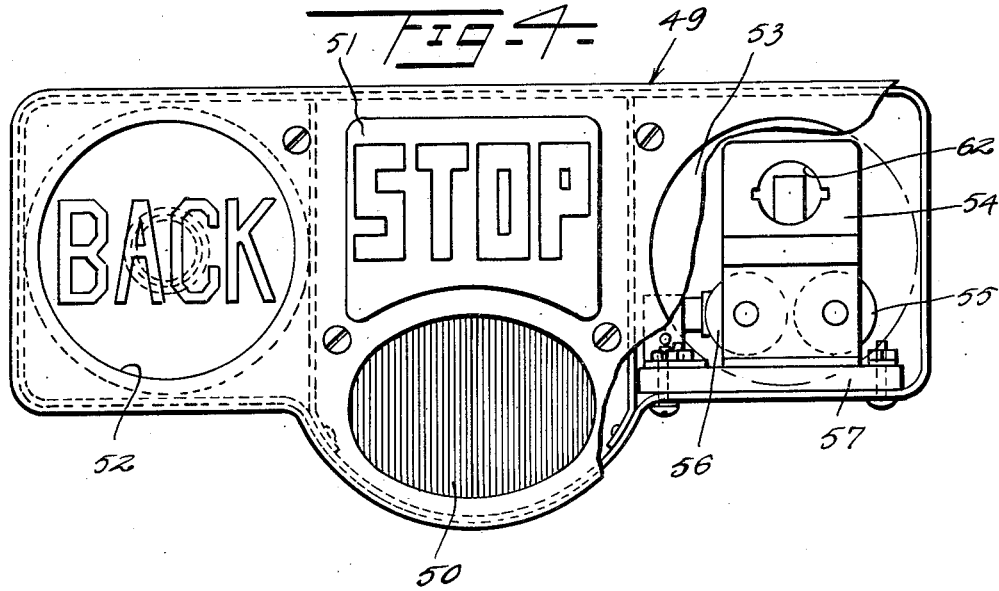
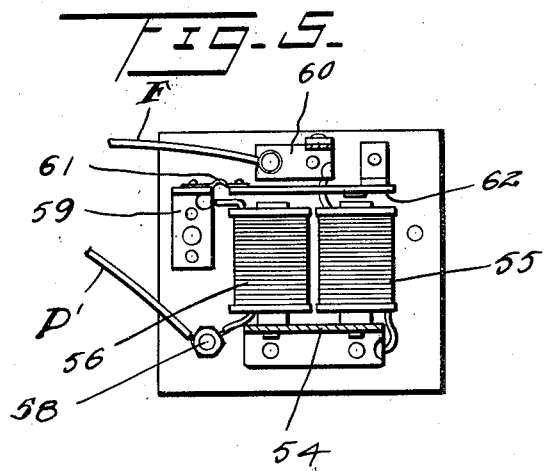
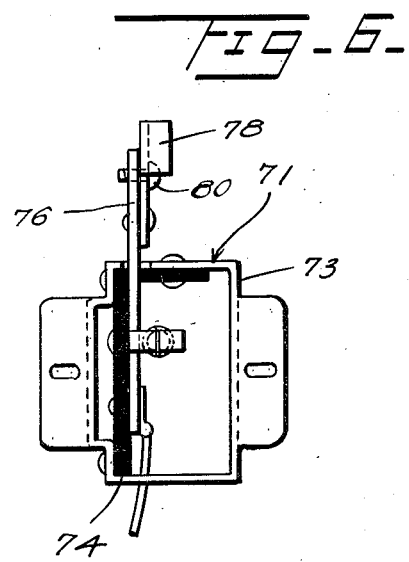
Inventor
Harold G. Ray
By Watson E. Coleman
Attorney Patented Oct. 8, 1935

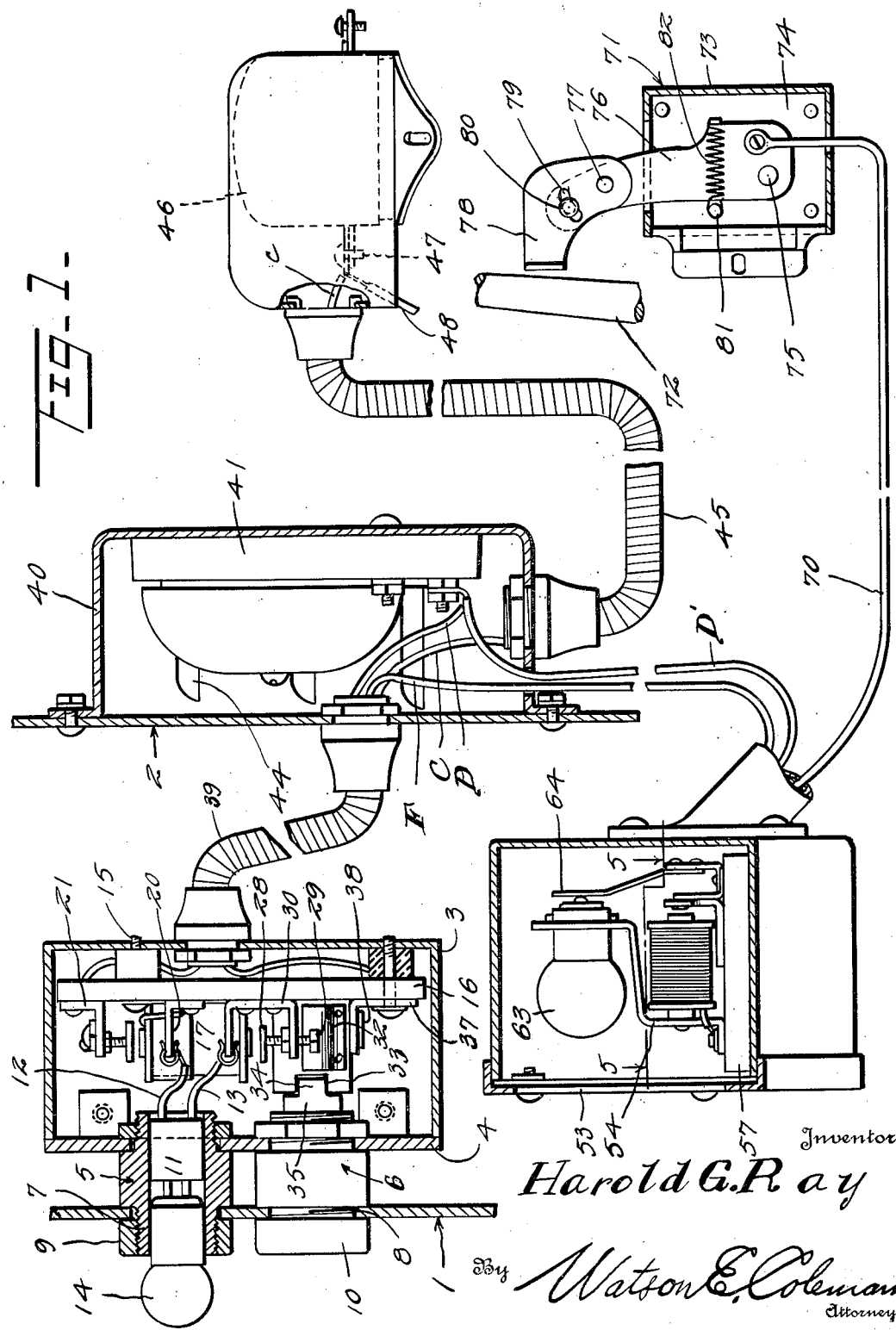

2,016,515

UNITED STATES PATENT OFFICE 2,016,515

AUTOMOBILE THEFT ALARM

Harold G. Ray, Los Angeles, Calif.

Application July 1, 1933, Serial No. 678,695

9 Claims. (Cl. 177—314)

This invention relates to improvements in signals and indicators and pertains particularly to a signal and indicator system for use upon motor vehicles.

The primary object of the present invention is to provide a signal system for use upon motor vehicles wherein an audible signal or alarm is set forth immediately upon the starting of the automobile engine when the control of the system has been set.

Another object of the invention is to provide an indicator system for motor vehicles wherein a visual signal is established upon and by the starting of the automobile engine and which remains operative after the engine has been stopped.

Still another object of the invention is to provide a system of the character described wherein the signal elements are made active by current from the engine operated generator and wherein a warning signal is given the vehicle operator upon the closing of the ignition switch, to unlock the alarm and indicator mechanism before starting the engine.

Still another object of the invention is to provide a signal mechanism wherein the starting of the vehicle engine will effect the tripping of an electric switch actuated by current from the engine operated generator, to establish electrical connection between the vehicle storage battery and an electrically operated signal so that the said signal will continue to be operated by current from the vehicle battery after the generator has stopped.

Still another object of the invention is to provide a signalling system of the character described for motor vehicles which is adapted to be so set that, when desired, the engine may be started and stopped any number of times without operating the signal and without the operator having to manipulate the same.

Still another object of the invention is to provide in association with a signal system of the character above described, an automatically actuated backing signal which operates through the placing of the gear mechanism in reverse and which also serves as a light for facilitating the backing of the car at night.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a diagrammatic lay-out of the signal system embodying the present invention;

Figure 2 is a view in front elevation of the bell housing and of the control housing, showing the electrical connections therebetween;

Figure 3 is a wiring diagram of the system;

Figure 4 is a view in rear elevation of the tail-light structure, a portion being broken away to show the visual signal element of the system;

Figure 5 is a sectional view taken substantially on the line 5—5 of Figure 1;

Figure 6 is a view in front elevation of the grounding switch structure when removed from the transmission housing.

Referring now more particularly to the drawings wherein like numerals of reference indicate corresponding parts throughout the several views, the numerals 1 and 2 in Figure 1 indicate respectively portions of a motor vehicle instrument dashboard and cowl dash upon which certain elements of the present alarm mechanism are mounted.

Upon the rear of the dashboard 1 of the motor vehicle is mounted the casing 3 having the removable cover 4. This cover has mounted thereon a light socket 5 and a cylinder lock 6. The light socket 5 and lock 6 have reduced forward end portions 7 and 8 respectively which are threaded and extend through suitable apertures in the dashboard 1 and receive upon their forward ends the nuts 9 and 10 which engage against the dashboard and secure the parts thereto with the casing 3. Within the socket 5 is a plug 11 having two terminals to which are connected the wires 12 and 13 and in the forward end of the plug is mounted an incandescent lamp 14 having suitable terminals for connection with the terminals of the wires.

Mounted upon suitable supporting screws 15 connected with the back wall of the housing 3, is an insulation panel 16 upon the front of which is mounted vertically the electro-magnet 17 which is preferably wound with 26 gauge wire. This magnet 17 has a central core 18, the two ends of which are exposed and one end of the winding of the magnet is connected with this core, while the other end, which is indicated by the numeral 19, connects with the terminal 20 which is mounted upon the insulation panel 16.

Mounted upon the panel 16 above the magnet 17 are the bracket terminals 21 and 22. The terminal 22 has secured thereto one end of an armature carrying spring 23, the armature which the spring carries being indicated by the numeral 24. This armature 24 overlies the upper end of the magnet core 18 and contact is made between the armature and the bracket terminal 21 through the medium of the adjustable screw 25 which is mounted in this terminal.

At one side of the magnet 17 is a terminal 26 to which is attached one end of a spring 27 which carries an armature 28 in position beneath the lower end of the core 18 so that it might be drawn upwardly thereagainst when the magnet is energized. The opposite or free end of this armature 28 is normally held by the spring 27 against an adjustable contact screw 29 carried by a terminal bracket 30. The terminal bracket 26 is grounded to the frame of the machine.

Upon the insulation panel 16 there is mounted beneath the armature 28 the rotor 31 which is of insulation material and which carries at diametrically opposite points the spring arms 32. This rotor at its forward end is slotted as indicated at 33 to receive the lug 34 of the rotatable inner member or barrel 35 of the lock 6. This barrel 35 may only be turned by a suitable key introduced into the forward end of the lock which is exposed on the face of the dashboard 1.

Beneath the rotor 31 are mounted, upon the panel 16, the spaced terminal contacts 36 and 37, to one of which, here indicated as the contact 36, is attached one end of the spring contact arm 38 which normally has its other end in electrical engagement with the terminal contact 37. When the rotor 31 is turned the necessary amount the arms 32 thereof will contact with the armature 28 and the spring arm 38, lifting the armature upwardly to bring it into contact with the lower end of the magnet core 18 and breaking its connection with the terminal 30 and shifting the free end of the arm 38 away from the terminal contact 37.

Connected with the back wall of the housing 3 is a conduit 39 which runs to and connects with the cowl dash 2 and housed in this conduit are the three electric wires C, D and F. The wire C connects with the terminal bracket 21, while the wire D connects with the terminal bracket 22 and the wire F connects with the terminal bracket 36. Secured to the back of the cowl dash 2 is a bell housing 40 which has an open side facing the dash 2 and into which the wires referred to lead from the conduit 39. Within the housing 40 is mounted an electric signal bell 41 having the two terminals 42 and 43. The wire D leads from the terminal 22 to the terminal 42 of the bell and the terminal 43 of the bell has connected therewith one end of the wire K which leads to and connects with the terminal 30. This bell 41 may be of any suitable type which will operate on a six volt current and the housing 40 in which it is enclosed is provided with side wall openings 44 to permit the sound of the operating bell to readily issue therefrom.

Connected with a wall of the bell housing 40 and opening thereinto, is one end of a conduit 45 which leads to and has its other end connected with the generator cut-out of the motor vehicle, which is indicated generally by the numeral 46. The wire C which leads from the terminal 21 passes through the bell housing 40 and through the conduit 45 and is connected at the point 47 of the cut-out where is attached the wire 48 which leads from the generator with which the cut-out is associated.

The letter S indicates the motor vehicle ignition switch which controls the passage of electric current from the battery B through the ammeter 69 to the wire 83, which connects with the ignition coil (not shown) of the system and with the terminal 20.

The numeral 49 indicates generally a rear or tail light structure having the usual red rear light window 50 and stop signal 51. At one side of the structure 49 is a light housing 52 in which is a light designed to be employed as a backing light, while at the opposite side is the window 53 for the stolen car indicating light structure, about to be described.

Within the structure 49 and behind the window 53 thereof, is disposed a bracket plate 54 upon the lower part of which are mounted the two electro-magnets 55 and 56. The bracket 54 is mounted upon an insulation body 57 and the magnet 55 has one end of the wire wound thereabout electrically connected with the bracket 54, while the other magnet 56 has one end of the wire thereof electrically connected with a terminal post 58 to which is attached one end of a wire D'. The other end of this wire leads to and is connected with the terminal 42 of the bell.

The magnets 55 and 56 are both wound in the same direction and with the same amount and size of wire.

Mounted upon the insulation base 57 are the two terminal brackets 59 and 60 and the bracket 59 has electrically connected therewith the other end of the wire of the magnet 56, while the bracket 60 has the other end of the wire of magnet 55 electrically connected to it. The terminal bracket 59 has attached thereto the spring 61 which carries an armature 62 which overlies the cores in the magnets 55 and 56 but which is designed to be brought into contact only with the core of the magnet 55.

The bracket 60 has electrically connected therewith the other end of the wire F which leads from the terminal 36 in the housing 1.

The bracket plate 54 has formed therethrough adjacent the top, the opening 62 which is formed to receive the base of an incandescent bulb 63, of the center contact type. Directly behind the opening 62 of this plate is a spring contact arm 64 with which the center contact of the bulb 63 engages, and which is electrically connected with the bracket terminal 60 to which the wire F is joined. The terminal bracket 59 is grounded as indicated by the numeral 65 in the circuit diagram in Figure 3 and the core of the magnet 55 is in electrical contact with the bracket 54 as is also illustrated in this diagram.

Within the reflector behind the lens 52 of the tail light structure there is mounted a two-contact electric light 66, one contact of which is electrically connected by the wire 67 with the wire 68 which is joined to the terminal 37 and which leads to the live wire connection to the ammeter 69 of the motor vehicle. The other contact of this light is connected by the wire 70 with a grounding switch which is indicated as a whole by the numeral 71 and which is mounted upon the vehicle transmission housing adjacent the gear shift lever 72. This grounding switch comprises a housing 73 in which is an insulation base 74 upon which is mounted by means of the pivot 75, the metallic arm 76 which extends upwardly through a suitable opening in the housing 73 and which has pivotally attached to its upper end by means of the pivot stud 77 the oscillation finger 78. This finger 78 has an arcuate slot 79 therein through which extends a securing screw 80 which engages the arm 76 and holds the finger in adjusted position.

The insulation base 74 carries a stud 81 to which is connected one end of a spring 82 which has its other end connected with the far side of the metallic arm 76 and which operates to constantly draw the arm toward the adjacent gear shift lever.

The stem is connected with the electric system of the motor vehicle to receive current therefrom, by the wire 83 which at one end is joined to the terminal bracket 20, while the other end is connected with the side of the motor vehicle ignition switch which is dead when the said switch is off. It will thus be seen that the signal system may be electrically disconnected from the current generating apparatus of the motor vehicle when the vehicle ignition switch is turned on and the lock 6 properly operated. The terminal bracket 26 which is upon the opposite side of the electro-magnet 17 from the terminal 20, is grounded as indicated at 84 in Figures 2 and 3.

The operation of the system is as follows:—

When the properly authorized person enters the vehicle equipped with the signal system and turns on the ignition switch preparatory to starting the engine, current will flow through the wire 83 to the signal light 14 by way of the wires 12 and 13. This is possible as the normal position of the armature 28 is in contact with the terminal 29 so that the proper ground connection is made for the signal light 14, as is illustrated in the circuit diagram shown in Figure 3. This warns the operator not to start the engine until the signal system has been shut off by the proper manipulation of the cylinder 35 of the lock 6. By inserting the key in the lock 6 the cylinder 35 is then turned through one-half rotation so that the arms 32 will turn over from the positions shown in dotted lines in Figure 2 or in full lines in Figure 3 and thus pass under and raise the armature 28 into contact with the magnet 17. This will break the circuit to the light 14 but will permit the current from the ignition switch to pass through the magnet to the ground 84 by way of the armature 28 and thus hold the armature raised and at the same time the magnet will attract the overlying armature 24 so as to break the electric line leading from the cut-out 46 to the signal bell 41. It is to be understood that the rotor 31 must be turned over a complete half turn to the point where the arms 32 will be free from contact with the armature 28 and the contact arm 38 so that when the engine ignition is turned off the armature 28 will be free to drop back into contact with the terminal 29 and the contact arm 38 will bridge the terminals 36 and 37. The motor vehicle engine may then be started without affecting the signal system.

Since the closed ignition switch of the motor vehicle results in the holding of the armatures 24 and 28 in contact with the core of the electro-magnet 17, it will be seen that even though the vehicle engine stop it can be started up again without having to manipulate the locking key which controls the rotor 31. However, after the operator of the vehicle brings the same to a stop in the place where the machine is to be left, and turns off the ignition, the armatures 24 and 28 will be released by the magnet 17 and, without further attention to the signal system, the latter will be automatically ready to give warning if anyone attempts to start the engine, who does not have the key necessary to turn the rotor 31.

After the machine has been left, should an unauthorized person attempt to start the motor, the signal bell 41 will immediately be set into operation for as soon as the engine begins to run some of the current generated by the engine generator will pass through the wire C to the terminal 21 and from there by way of the armature 24, will pass to the wire D to the signal bell, the circuit from the bell being completed through the wire K, the armature 28, to the ground 84. At the same time the electro-magnetic switch housed in the tail light behind the window 53 will become effective by a portion of the current from the generator passing through the wire D' which is connected with the terminal 42, to the electro-magnet 56 and to the ground 65. This will result in the drawing down, by the magnet 56, of the the armature 62 which will be brought into contact with the core of the magnet 55. This armature does not, however, contact with the core of the magnet 56. As soon as the armature 62 is drawn into contact with the core of the magnet 55 current will flow from the storage battery of the motor vehicle, by way of the wire 68 which is coupled with the vehicle ammeter, through the contact arm 38 and wire F, to the signal lamp 63 from where it will pass to the ground by way of the bracket plate 54, the core of the magnet 55, and the armature 62.

At the same time the current will flow through the coil of the magnet 55 and to the ground through this magnet core and the armature 62 so that even though the person in the machine shuts off the engine so as to abandon the machine as a result of the ringing of the signal bell, the signal light 63 will continue to operate as it does not depend for its operation upon the running of the motor operated generator.

Where it is desired to leave the motor vehicle so that it may be moved about, but the operator does not wish to leave in the vehicle the key for the manipulation of the lock 6, as, for example, when the machine is to be parked upon a parking lot, where it is necessary to leave the keys with an attendant, the signal system may be set by the operator of the machine, by giving the rotor 31 a quarter turn and leaving it in the position in which it is shown in full lines in Figure 2. It will thus be seen that the circuit to the signal lamp 14 is opened as also is the circuit to the rear signal lamp 63. The parking lot attendant may then move the machine as necessary without operating either the audible or visual signals of the alarm system for, as will be readily apparent, as soon as the ignition switch is turned on for the purpose of moving the machine some current will flow through the magnet 17 so as to draw down the armature 24 and thus break the circuit to the signal bell.

Should the present signal system be employed in motor vehicles having automatically operating starters where the starter operates to turn the engine over as soon as the ignition switch is turned on, a slightly different preliminary procedure is followed. In this case the controlling key for the lock 6 is given a quarter turn before the ignition switch of the engine is closed, so that the elements in the control box 1 will assume the position in which they are shown in full lines in Figure 2. After the motor has started the key may then be turned the rest of the way or though the necessary 180° movement so that the rotor 31 will assume the position in which it is shown in Figure 3.

The backing light 66 which is housed in the rear light structure 49, operates automatically when the gear shift lever is moved to put the car in reverse. As will be readily apparent from the circuit diagram taken with the grounding switch structure shown in Figure 1, as soon as the lever 72 is shifted to reverse position it will be brought into contact with the finger 78 of the grounding switch and the circuit for the line 66 will be completed. In addition to the light 66 functioning as a means for illuminating the ground in the rear of the machine when the same is to be backed, the lens in the window 52 of the tail light may have the word, "Back" thereon so that it will serve at all times as a warning to persons in the rear that the machine is to be moved rearwardly.

Having thus described the invention, what is claimed is:—

1. An alarm for a motor vehicle having an engine operated generator, an ignition switch and a battery source of potential, comprising an alarm signal element, current conducting means connecting one side of said element with one side of the generator and including a signal switch, the other side of said generator being connected to one side of the battery source of potential, an electric current conductor connecting the other side of the signal with the said one side of the battery source of potential and including a second signal switch, an electromagnet including a coil and core, said signal switches each including a pair of contacts and an arm connected with one contact and movable relative to the other, said signal switches being on opposite sides of the alarm, said electromagnet having its core disposed between the arms of said signal switches for the attraction and opening of the same when the magnet is energized, an electric conductor connected between one side of said magnet coil and said source of potential and having said ignition switch in circuit in the connection, the other side of said coil being electrically connected with the magnet core for connection through a switch arm with the other side of the source of potential, and a key controlled camming element adapted when actuated to bring said last mentioned signal switch arm into electric connection with the magnet core.

2. An alarm for a motor vehicle having an engine operated generator, an ignition switch and a battery source of potential, comprising an alarm signal element, an electric current conductor connecting one side of said element with one side of the generator, the other side of said generator being connected to one side of said battery source of potential, an electric current conductor connecting the other side of the signal with the other side of the source of electric potential, an electromagnet including a coil and core, a pair of switches each including a pair of contacts and an arm connected with one contact and movable relative to the other, said switches being connected in circuit with the alarm and the generator on opposite sides of the alarm the said electromagnet having its core disposed between the arms of said switches for the attraction and opening of the same when the magnet is energized, an electric conductor connected between one side of said magnet coil and said source of potential and having said ignition switch in circuit in the connection, the other side of said coil being electrically connected with the magnet core for connection through a switch arm with the other side of the source of potential, a key controlled camming element adapted when actuated to bring said last mentioned switch arm into electric connection with the magnet core, a second alarm signal, a circuit including the second signal and said source of electric potential, a second electromagnet having an armature and a core, said second armature and core when brought together being in circuit with and closing the circuit of the second signal and further placing the magnet in circuit with the source of potential, an electromagnetic means electrically connected with and operated by current developed by the generator to initially move the armature of the second mentioned magnet into contact with its core.

3. An alarm for a motor vehicle having an engine operated generator, an ignition switch and a battery source of potential, comprising a signal, an electric circuit having the signal and the generator therein, key operated means for opening said circuit, and electrically actuated means placed in circuit with said battery source of potential when said key operated means is actuated after the switch is closed, which maintains said electric circuit open independently of the said key operated means.

4. In an alarm for a motor vehicle having an engine operated generator, an ignition switch and a battery source of potential, an electric circuit having the generator therein, a signal in said circuit, a pair of switches in said circuit and on opposite sides of the signal, a second circuit having said ignition switch and said battery source of potential therein and including a portion of the first circuit, key operated means for actuating one of the switches of said pair to open the same, and electromagnetic means in the second circuit which is energized when the second circuit is closed, said second circuit being closed by the actuation of the said one of the pair of switches when the latter is actuated to open the first circuit, and said electromagnetic means when energized effecting the opening of the other one of the pair of switches.

5. In an alarm for a motor vehicle having a generator, an ignition switch and a battery source of potential, an electric circuit having said switch and battery source of potential therein, an electromagnet in said circuit, said magnet having a coil connected to the core thereof, a grounded armature for said magnet constituting a switch arm, said armature normally being spaced from the magnet core, key operated means for moving said armature toward said core, the movement of the armature by said means closing said circuit and energizing said magnet after the ignition switch has been closed, a signal circuit having said generator therein and including said grounded armature, said armature when influenced by the energized electromagnet maintaining said signal circuit open, a signal device in said circuit, a second armature for the electromagnet constituting a second switch in said signal circuit which is opened when the first mentioned circuit is closed, a distinctive rear light signal circuit having said battery source of potential and a signal element therein, an electromagnetically operated switch in said tail light signal circuit, and means for conducting electric current to said tail light circuit controlling switch from a point in the first circuit between the first signal and the said second switch.

6. In an alarm for a motor vehicle having a generator, an ignition switch and a battery source of potential, an electric circuit having said ignition switch therein, a second switch in said circuit, key operated means for closing said second switch, the closing of the second switch completing the circuit after the closing of the ignition switch, means operating to retain the second switch closed after the actuation and independently of the key operated means therefor, a signal circuit having said generator therein, a signal in the signal circuit, means actuated by the second switch retaining means for maintaining the signal circuit open while the first circuit is closed, a second signal, and means operated by the flow of current through the signal circuit to electrically couple and maintain the second signal in circuit with said battery source of potential after the circuit for the first signal has been opened.

7. An alarm for a motor vehicle having an engine operated generator, an ignition switch, and a battery source of potential, comprising a signal, an electrical connection between one side of the signal and one side of the generator, a second switch, electricity conducting means having said second switch therein and grounding the other side of said signal when the second switch is closed, key operated means for opening the second switch and grounding the ignition switch, and electromagnetic means which is placed in circuit with said battery source of potential and said ignition switch and energized when the ignition switch is grounded, to maintain the second switch open upon operation of the key operated means to effect the opening of the second switch while the ignition switch is closed.

8. An alarm for a motor vehicle having an engine operated generator, an ignition switch, and a battery source of potential, comprising a signal, an electrical connection between one side of the signal and one side of the generator, a second switch, electricity conducting means having said second switch therein and grounding the other side of said signal when the second switch is closed, key operated means for opening the second switch, electromagnetic means in circuit with said battery source of potential and said ignition switch for maintaining the second switch open upon operation of the key operated means when the ignition switch is closed, means operated by the energization of the said electromagnetic means for opening the said connection between the signal and generator, a distinctive rear signal, means electrically connecting one side of the said distinctive rear signal with the source of battery potential, an electromagnet including a coil, core and armature, said armature being grounded and said distinctive rear signal being electrically connected with the core, said coil being connected at one end with said core and at its other end with the battery through said last means, and a second electromagnet arranged to attract said armature when energized, having one side grounded and having electrical connection between its other side and the portion of the electricity conducting means between the first signal and the said means for opening the connection between the first signal and generator.

9. In an alarm for a motor vehicle having a generator, an ignition switch and a battery source of potential, an electric circuit having said ignition switch therein, a second switch in said circuit, key operated means for closing said second switch, the closing of the second switch completing the circuit after the closing of the ignition switch, means operating to retain the second switch closed after the actuation and independently of the key operated means therefor, a signal circuit having said generator therein, a signal in the signal circuit, means actuated by the second switch retaining means for maintaining the signal circuit open while the first circuit is closed, a second signal, a circuit having said second signal and source of potential in series therein, a switch in said last circuit, electromagnetic means connected with and energized only by current from said generator and which when energized closes the last mentioned switch, and means made operative by the closing of the last mentioned switch which maintains the said last mentioned switch closed after the circuit for the first signal has been opened.

HAROLD G. RAY.